(12) United States Patent
Takahashi

(10) Patent No.: US 12,288,415 B2
(45) Date of Patent: *Apr. 29, 2025

(54) SELECTING IMAGE TO DISPLAY BASED ON FACIAL DISTANCE BETWEEN TARGET PERSON AND ANOTHER PERSON

(71) Applicant: NEC Corporation, Tokyo (JP)

(72) Inventor: Daiki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,844

(22) Filed: Dec. 27, 2023

(65) Prior Publication Data

US 2024/0127626 A1    Apr. 18, 2024

Related U.S. Application Data

(63) Continuation of application No. 17/424,115, filed as application No. PCT/JP2020/001872 on Jan. 21, 2020, now Pat. No. 12,190,631.

(30) Foreign Application Priority Data

Jan. 24, 2019    (JP) ................ 2019-010011

(51) Int. Cl.
*G06V 40/16*    (2022.01)
*G06T 7/70*    (2017.01)

(52) U.S. Cl.
CPC .............. *G06V 40/161* (2022.01); *G06T 7/70* (2017.01); *G06T 2207/30201* (2013.01)

(58) Field of Classification Search
CPC .... G06V 40/161; G06V 10/25; G06V 40/103; G06V 40/172; G06T 7/70; G06T 2207/30201; G06T 1/00; G06F 16/583
See application file for complete search history.

(56) References Cited

U.S. PATENT DOCUMENTS

| | | | |
|---|---|---|---|
| 2012/0201468 A1 | 8/2012 | Oami et al. | |
| 2016/0080729 A1* | 3/2016 | Watanabe | H04N 13/225 348/54 |
| 2017/0024626 A1 | 1/2017 | Inaba | |

(Continued)

FOREIGN PATENT DOCUMENTS

| | | |
|---|---|---|
| JP | 2007-287179 A | 11/2007 |
| JP | 2007-328572 A | 12/2007 |

(Continued)

OTHER PUBLICATIONS

A. Wrońska, K. Sarnacki and K. Saeed, "Athlete number detection on the basis of their face images," 2017 International Conference on Biometrics and Kansei Engineering (ICBAKE), Kyoto, Japan, 2017, pp. 84-89, doi: 10.1109/ICBAKE.2017.8090642. (Year: 2017).*

(Continued)

*Primary Examiner* — Andrae S Allison

(57) ABSTRACT

The information processing apparatus includes: an acquisition unit for acquiring an image including a face image of a person; and a selection unit for selecting the image in which the part other than the face of a target person is captured among the plurality of images by using the position of the face image of a person other than the target person in the acquired image.

12 Claims, 15 Drawing Sheets

(56) References Cited

U.S. PATENT DOCUMENTS

| | | | |
|---|---|---|---|
| 2018/0107877 A1* | 4/2018 | Inaba | G06V 40/171 |
| 2018/0218200 A1* | 8/2018 | Wolf | G06V 40/45 |
| 2018/0276873 A1* | 9/2018 | Croxford | G06T 15/20 |
| 2019/0188456 A1* | 6/2019 | Shibata | G06V 10/757 |
| 2021/0027067 A1* | 1/2021 | Druihle | G06V 20/63 |

FOREIGN PATENT DOCUMENTS

| | | |
|---|---|---|
| JP | 2009-246799 A | 10/2009 |
| JP | 2010-211263 A | 9/2010 |
| JP | 2010-244090 A | 10/2010 |
| JP | 5246946 B2 | 7/2013 |
| JP | 2013190673 A * | 9/2013 |
| JP | 5664553 B2 | 2/2015 |
| JP | 2016-053763 A | 4/2016 |
| JP | 2016-119059 A | 6/2016 |
| JP | 2016-212615 A | 12/2016 |
| JP | 2018-025966 A | 2/2018 |

OTHER PUBLICATIONS

C. H. Morimoto and M. Flickner, "Real-time multiple face detection using active illumination," Proceedings Fourth IEEE International Conference on Automatic Face and Gesture Recognition (Cat. No. PR00580), Grenoble, France, 2000, pp. 8-13, doi: 10.1109/AFGR.2000.840605. (Year: 2000).*

International Search Report for PCT Application No. PCT/JP2020/001872, mailed on Apr. 14, 2020.

English translation of Written opinion for PCT Application No. PCT/JP2020/001872, mailed on Apr. 14, 2020.

A. Wrońska, K. Sarnacki and K. Saeed, "Athlete number detection on the basis of their face images," 2017 International Conference on Biometrics and Kansel Engineering (ICBAKE), Kyoto, Japan, 2017, pp. 84-89, doi: 10.1109/ICBAKE.2017.8090642. (Year: 2017).

* cited by examiner

REGISTRANT INFORMATION

| REGISTRANT ID | FACE IMAGE | CLASSIFICATION | REASON FOR REGISTRATION | NAME | ... |
|---|---|---|---|---|---|
| 00101 | | PERSON REQUIRING ATTENTION | SUSPICIOUS PERSON | — | ... |
| 00102 | | PERSON REQUIRING ATTENTION | SUSPICIOUS PERSON | — | ... |
| 00103 | | PERSON REQUIRING ATTENTION | WRONGDOING | [NAME_1] | ... |
| ... | ... | ... | ... | ... | ... |

FIG. 8

SELECTING IMAGE TO DISPLAY BASED ON FACIAL DISTANCE BETWEEN TARGET PERSON AND ANOTHER PERSON

This application is a Continuation of U.S. application Ser. No. 17/424,115 filed on Jul. 19, 2021, which is a National Stage Entry of PCT/JP2020/001872 filed on Jan. 21, 2020, which claims priority from Japanese Patent Application 2019-010011 filed on Jan. 24, 2019, the contents of all of which are incorporated herein by reference, in their entirety.

TECHNICAL FIELD

The present invention relates to an information processing apparatus, an information processing method, and a storage medium.

BACKGROUND ART

Patent Literature 1 discloses a whole body region estimation device capable of accurately separating and extracting a whole body region of each person even in a scene in which a plurality of persons appear overlapping on a screen. The device estimates the whole body area of each person based on the size and the direction of the face in the image, and outputs a whole body thumbnail image obtained by deleting the overlapped part when it is determined that the whole body areas of different persons overlap.

CITATION LIST

Patent Literature

PTL 1: Japanese Patent No. 5246946

SUMMARY OF INVENTION

Technical Problem

In recent years, the introduction of a face recognition system has been promoted in stores such as retail stores and department stores. When a previously registered suspicious person or a person requiring attention (Hereinafter referred to as the "target person".) comes to the store, the face authentication system detects the face of the target person and immediately notifies the detection information to a terminal carried by the security guard. Here, when the security guard searches for the target person, it is easy to search by referring to not only the face but also the whole body image which can confirm the clothes. However, if a person other than the target person (Hereinafter referred to as "peripheral person".) is present in a state where the person overlaps in front of the target person in a capturing image at the moment when the face authentication system detects the face of the target person, a part or most of the clothes of the target person may be hidden by the peripheral person, and the clothes may not be confirmed.

On the other hand, Patent Literature 1 merely discloses that the deleted area is displayed in a shaded manner so that the whole body area of each person in the image can be easily discriminated. When the target person and the peripheral person overlap each other, the clothing portion of the target person is displayed in a shaded manner, and even if the user refers to the image, the face and clothing of the target person may not be confirmed together.

Accordingly, it is an object of the present invention to provide an information processing apparatus, an information processing method, and a storage medium capable of selecting an image that makes it easy to confirm the face and clothes of a target person.

Solution to Problem

According to one aspect of the present invention, provided is an information processing device including: an acquisition unit for acquiring an image including a face image of a person; and a selection unit for selecting the image in which the part other than the face of a target person is captured among the plurality of images by using the position of the face image of a person other than the target person in the acquired image.

According to yet another aspect of the present invention, provided is an information processing method including: acquiring an image including a face image of a person; and selecting the image in which the part other than the face of a target person is captured among the plurality of images by using the position of the face image of a person other than the target person in the acquired image.

According to yet another aspect of the present invention, provided is a storage medium storing a program that causes a computer to perform: acquiring an image including a face image of a person; and selecting the image in which the part other than the face of a target person is captured among the plurality of images by using the position of the face image of a person other than the target person in the acquired image.

Advantageous Effects of Invention

According to the present invention, an information processing apparatus, an information processing method, and a storage medium are provided, which can select an image in which the face of a target person and the clothes thereof can be easily confirmed.

BRIEF DESCRIPTION OF DRAWINGS

FIG. 8 is a diagram illustrating an example of a monitoring screen displayed on the management server in the first example embodiment.

DESCRIPTION OF EMBODIMENTS

Illustrative example embodiments of the present invention will be described below with reference to the drawings. Throughout the drawings, the same components or corresponding components are labeled with the same references, and the description thereof may be omitted or simplified.

First Example Embodiment

Figure 1:
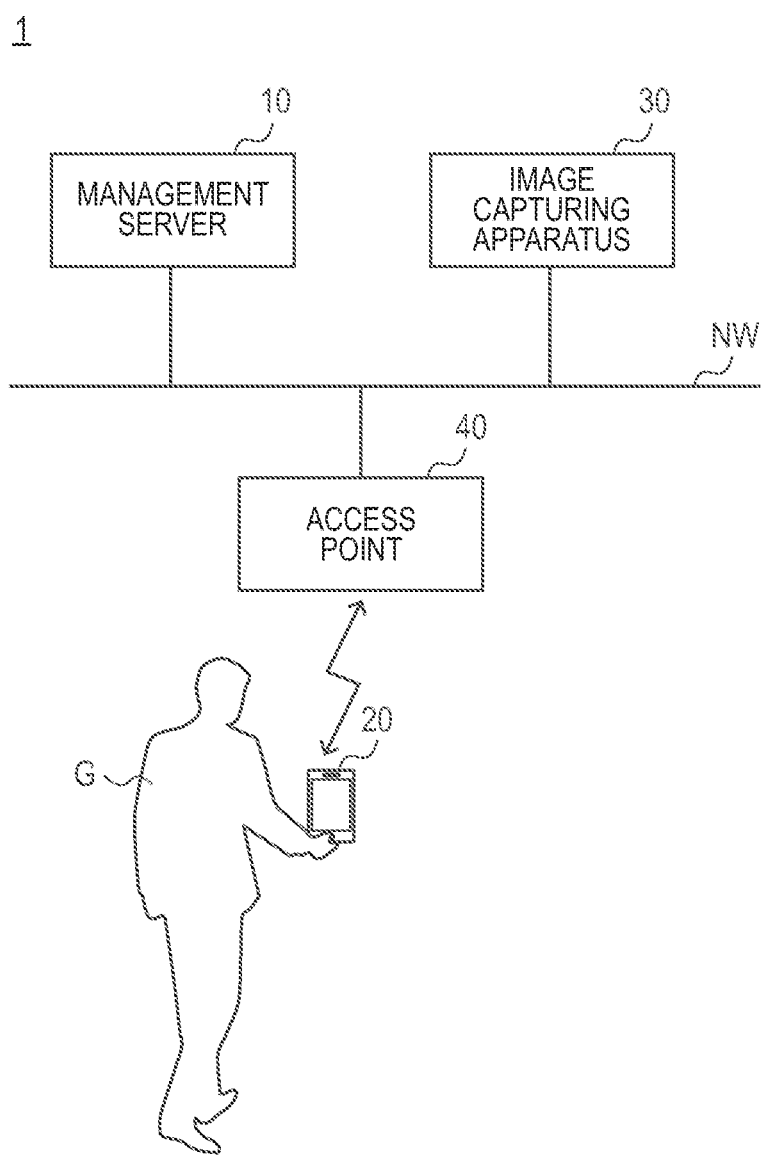
FIG. 1 is a block diagram illustrating an example of an overall configuration of a monitoring system in a first example embodiment.

First, the configuration of a monitoring system 1 in the present example embodiment will be described with reference to FIGS. 1 to 6. FIG. 1 is a block diagram illustrating an example of an overall configuration of the monitoring system 1 in the present example embodiment. The monitoring system 1 is an information processing system provided with a management server 10, a user terminal 20, a image capturing apparatus 30, and an access point 40. The monitoring system 1 is installed in various facilities such as stores such as retail stores and department stores, companies, transportation systems, and factories. The monitoring system 1 of the present example embodiment detects a person to be detected such as a suspicious person, etc (Hereinafter referred to as the "target person".) previously registered in a database from among capturing images of a image capturing apparatus 30, based on a face authentication technology, and immediately notifies a security guard G of detection information of the target person. As shown in FIG. 1, the management server 10, the image capturing apparatus 30, and the access point 40 are connected to a network NW such as a LAN (Local Area Network) or the Internet. The user terminal 20 performs wireless communication with the access point 40 and is connected to the network NW via the access point 40.

The management server 10 is an information processing device that is a core of the monitoring system 1, and has a database for storing registrant information of the target person, capturing images collected from the image capturing apparatus 30, etc. The management server 10 also has a matching function of a person included in the capturing image with the target person, a detection notification function of the target person to the user terminal 20, and the like.

The user terminal 20 is, for example, a portable terminal device such as a smartphone or a tablet terminal. The user terminal 20 of the present example embodiment is assumed to be a smartphone and is used by the security guard G as the user to confirm the target person.

The image capturing apparatus 30 is, for example, a security camera installed in an arbitrary number in a monitoring area of a facility such as a store or a company, and sequentially transmits capturing image data to the management server 10 via the access point 40. In FIG. 1, the image capturing apparatus 30 is wired to the management server 10 via the network NW, but the connection method is not limited to the wired connection. The image capturing apparatus 30 may be wirelessly connected to the management server 10.

Figure 2:
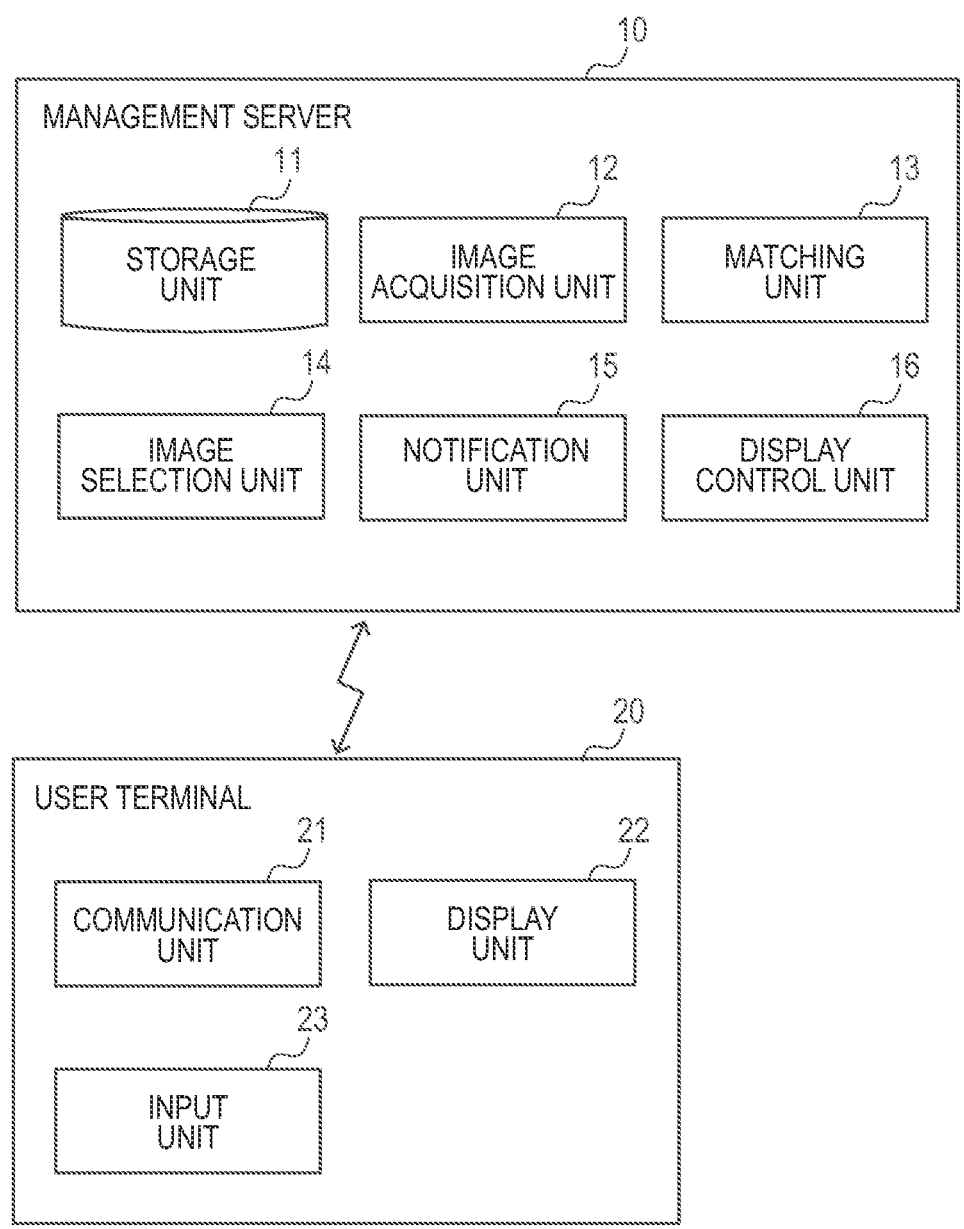
FIG. 2 is a block diagram illustrating a function of a monitoring system in the first example embodiment.

FIG. 2 is a block diagram illustrating the functions of the monitoring system 1 in the present example embodiment. The management server 10 includes a storage unit 11, an image acquisition unit 12, a matching unit 13, an image selection unit 14, a notification unit 15, and a display control unit 16.

Figures 3, 4:
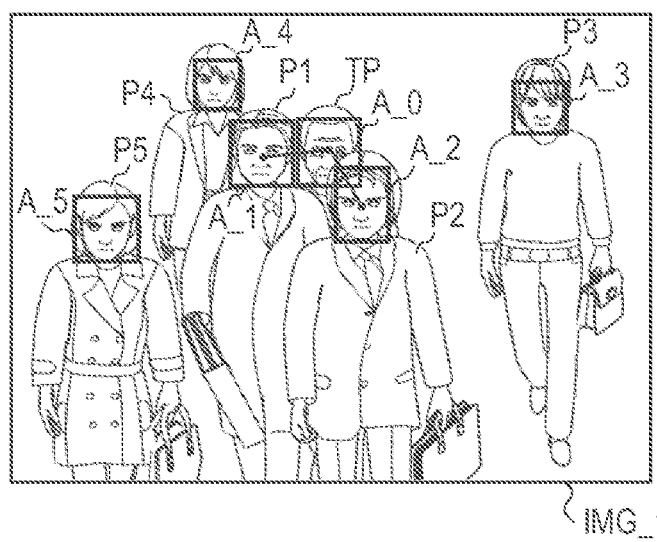
FIG. 3 is a diagram illustrating an example of registrant information stored in a storage unit in the first example embodiment.
FIG. 4 is a diagram explaining an image selection method in the first example embodiment.

The storage unit 11 stores a data file necessary for processing a program in the management server 10, a capturing image collected from the image capturing apparatus 30, registrant information of the target person, etc. As the registrant information, a blacklist, a whitelist, a VIP list, and an employee list, etc are listed. FIG. 3 is a diagram illustrating an example of registrant information stored in the storage unit 11 in the present example embodiment. Here, as the data items of the registrant information, the registrant ID, the face image, the division, the reason for registration and the name are listed. However, data items are not limited to these.

When the image acquisition unit 12 acquires a capturing image from the image capturing apparatus 30 via the network NW, the acquired capturing image is stored in a storage unit 11. The image acquisition unit 12 stores the capturing date and time of the image, the capturing place, the device ID of the image capturing apparatus 30 and the like in the storage unit 11 as attribute information together with the capturing image.

The matching unit 13 analyzes the image acquired by the image acquisition unit 12, and detects a face image corresponding to a face area of each person included in the image. The matching unit 13 also matching the biometric information obtained from the detected face image with the biometric information groups of the plurality of registrants previously registered in the database (storage unit 11).

It is to be noted that the term "biometric information" in present example embodiment means the feature amount extracted from the face image and the face image. The feature quantity may be a quantity indicative of a feature of the face, such as, for example, the position of a characteristic part, such as a pupil, nose, or mouth end.

The image selection unit 14 selects the capturing image in which the part other than the face of the target person is captured among the plurality of capturing images (monitoring logs) by using the position of the face image of a person other than the target person (Hereinafter referred to as "peripheral person".) in the capturing image acquired by the image acquisition unit 12. In the present example embodiment, the "the part other than the face of the target person" is, for example, a torso portion, an arm portion, a leg portion, etc., but in terms of the clothing of the target person, in terms of identifying the target person's clothing, it is primarily a torso portion.

Figure 5:
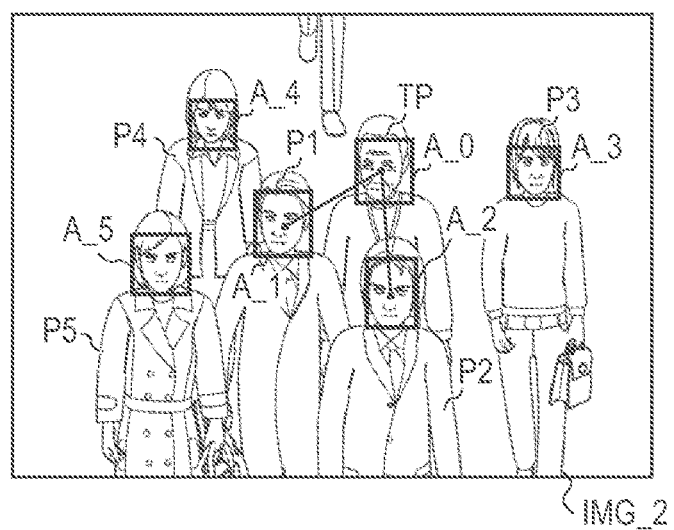
FIG. 5 is a diagram explaining the image selection method in the first example embodiment.

FIGS. 4 and 5 are diagrams explaining an image selection method in the present example embodiment. In the capturing image IMG_1 shown in FIG. 4, five peripheral persons P1 to P5 are included in addition to the target person TP. The rectangular area indicated by the solid line in the figure shows the face detection areas A_0 to A_5 of the target person TP and the peripheral persons P1 to P5, respectively. Here, since the peripheral persons P1 and P2 are in front of the target person TP, most of the body part of the target person TP is hidden, and it is difficult to confirm the clothes.

On the other hand, in the capturing image IMG_2 shown in FIG. 5, the peripheral persons P1 and P2 are separated from the target person TP in comparison with the case of FIG. 4. That is, the coordinate distance between the center coordinate point of the face detection area A_0 of the target person TP and the center coordinate point of the face detection area A_1 of the peripheral person P1 is longer in FIG. 5 than in FIG. 4. Similarly, the coordinate distance between the center coordinate point of the face detection area A_0 of the target person TP and the center coordinate point of the face detection area A_2 of the peripheral person P2 is longer in FIG. 5 than in FIG. 4.

In the capturing image IMG_2, a body part and an arm part of the target person TP can be visually recognized. That is, the capturing image IMG_2 is more suitable than the capturing image IMG_1 as an image for confirming the target person TP. Therefore, when the capturing image IMG_1 is initially displayed as a screen to be referred to by the security guard G, the image selection unit 14 newly selects the capturing image IMG_2 and switches the display image. Note that, as shown in FIGS. 4 and 5, when a plurality of peripheral persons exist around the target person TP, the image selection unit 14 calculates the inter-coordinate distance for all the persons and adopts the shortest distance among the plurality of inter-coordinate distances.

The notification unit 15 transmits display control information of a notification screen related to the target person to the user terminal 20 when the target person registered in the database is detected. The display control information includes a capturing image (original image) in which the target person is detected, a face image of the target person extracted from the capturing image, a face image of the registrant, and registration information.

The display control unit 16 outputs display control information to the display device 156. When the target person registered in the database is detected by the analysis processing of the capturing image in the matching unit 13, the display control unit 16 causes the user terminal 20 to display a monitoring screen of the target person on a display device 256 described later.

As shown in FIG. 2, the user terminal 20 includes a communication unit 21, a display unit 22, and an input unit 23. The communication unit 21 transmits and receives data to and from the management server 10 by radio communication. When the communication unit 21 receives the display control information from the management server 10, the display unit 22 displays a notification screen based on the display control information on the display device 256 described later. The input unit 23 receives a user operation through a user interface such as a touch panel. The screen contents displayed on the display device 256 are switched in response to an input to the input unit 23.

Figure 6:
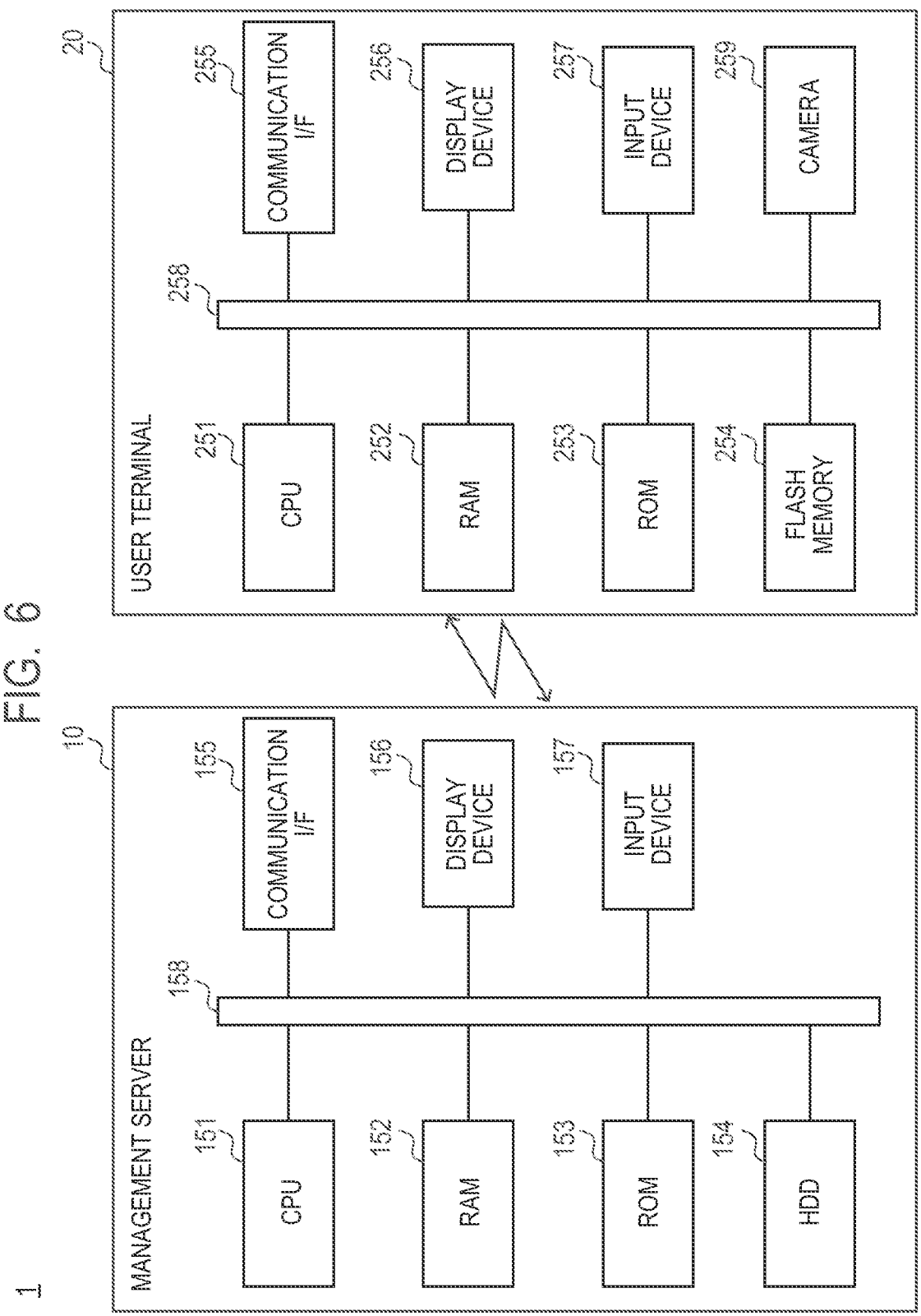
FIG. 6 is a block diagram illustrating an example of a hardware configuration of a management server and a user terminal in the first example embodiment.

FIG. 6 is a block diagram illustrating a hardware configuration example of the management server 10 and the user terminal 20 in the example embodiment. The management server 10 has a central processing unit (CPU) 151, a random access memory (RAM) 152, a read only memory (ROM) 153, and a hard disk drive (HDD) 154 as a computer that performs calculation, control, and storage. Further, the management server 10 has a communication interface (I/F) 155, a display device 156, and an input device 157. The CPU 151, the RAM 152, the ROM 153, the HDD 154, the communication I/F 155, the display device 156, and the input device 157 are connected to each other via a bus 158. Note that the display device 156 and the input device 157 may be connected to the bus 158 via drive devices (not illustrated) that drive these devices.

The CPU 151 is a processor having a function of performing a predetermined operation in accordance with a program stored in the ROM 153, the HDD 154, or the like and controlling each unit of the management server 10. The RAM 152 is formed of a volatile storage medium and provides a temporary memory region required for the operation of the CPU 151. The ROM 153 is formed of a nonvolatile storage medium and stores necessary information such as a program used for the operation of the management server 10. The HDD 154 is formed of a nonvolatile storage medium and is a storage device that stores data required for processing, an operating program of the management server 10, or the like.

The communication I/F 155 is a communication interface based on the specification such as Ethernet (registered trademark), Wi-Fi (registered trademark), 4G, or the like and is a module used for communicating with other devices. The display device 156 is a liquid crystal display, an OLED (Organic Light Emitting Diode) display, or the like and is used for displaying an image, a text, interface, or the like. The input device 157 is a keyboard, a pointing device, or the like and is used by the user to operate the management server 10. The example of the pointing device may be a mouse, a trackball, a touch panel, a pen tablet, or the like. The display device 156 and the input device 157 may be integrally formed as a touch panel.

The CPU 151 loads a program stored in the ROM 153, the HDD 154, or the like into the RAM 152 and executes the program. Thereby, the CPU 151 implements the function of the image acquisition unit 12, the matching unit 13, the image selection unit 14, the notification unit 15, and a display control unit 16, and the like described above. Furthermore, the CPU 151 implements the function of the storage unit 11 by controlling the HDD 154.

Similarly, the user terminal 20 has a CPU 251, a RAM 252, a ROM 253, a communication I/F 255, a display device 256, and an input device 257 as a computer that performs calculation, control, and storage. Since these devices are the same as the CPU 151, the RAM 152, the ROM 153, the communication I/F 155, the display device 156, and the input device 157 of the management server 10, the detailed description thereof will be omitted. Further, the user terminal 20 of the example embodiment is a smartphone and thus has a flash memory 254 instead of the HDD 154 as a mass storage region. Further, the user terminal 20 further has a camera 259 such as a digital camera that can capture a still image and a moving image. The CPU 251, the RAM 252, the ROM 253, the communication I/F 255, the display device 256, the input device 257, the flash memory 254, and the camera 259 are connected to each other via the bus 258.

The CPU 251 loads a program stored in the ROM 253 or the like into the RAM 252 and executes the program. Thereby, the CPU 251 implements the function of the communication unit 21, the display unit 22, the input unit 23, and the like described above.

Note that the hardware configuration illustrated in FIG. 6 is an example, and a device other than the above may be added, or some of the devices may be omitted. Further, some of the devices may be replaced with another device having the same function. Further, a part of the function of the example embodiment may be provided by another device via the network NW, and the function of the example embodiment may be distributed and implemented in a plurality of devices. For example, the HDD 154 may be replaced with a solid state drive (SSD) using a semiconductor memory or may be replaced with a cloud storage.

Figure 7:
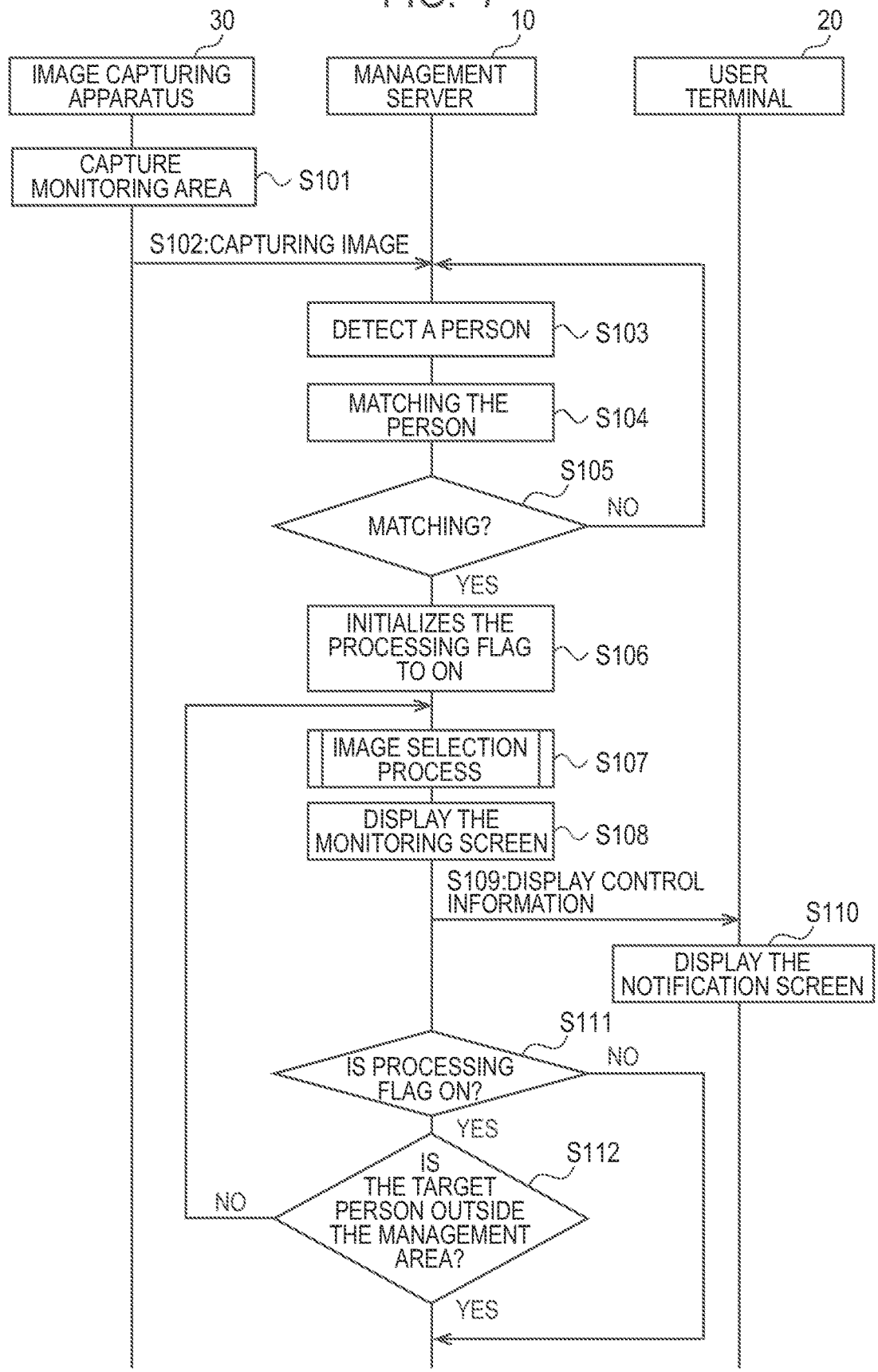
FIG. 7 is a sequence diagram illustrating an example of a processing of a monitoring system in the first example embodiment.

Next, the operation of the monitoring system 1 configured as described above will be described. FIG. 7 is a sequence diagram illustrating an example of processing of the monitoring system 1 in the present example embodiment. The processing shown in FIG. 7 is an example, and the order of the processing can be changed appropriately.

First, when the image capturing apparatus 30 captures the monitoring area (step S101), the image capturing apparatus 30 transmits the capturing image to the management server 10 (step S102). A management server 10 (image acquisition unit 12) stores a capturing image received from the image capturing apparatus 30 in a database (storage unit 11). Noted that the processes in steps S101 to S102 are repeated.

Next, the management server 10 (matching unit 13) analyzes the capturing image read from the database and detects all the persons present in the image (step S103).

Next, the management server 10 (matching unit 13) performs matching processing on the detected person and the registrant previously registered in the database (step S104).

Next, the management server 10 (matching unit 13) determines whether or not the matching result between the detected person and the registrant is matching (step S105). If the management server 10 (matching unit 13) determines that the matching result is matching (step S105: YES), the process proceeds to step S106. On the other hand, if the management server 10 (matching unit 13) determines that the matching result is not matching (step S105: NO), the process returns to step S103.

In step S106, when the management server 10 initializes the processing flag to ON, the management server 10 (image selection unit 14) executes image selection processing (step S107). The processing flag is turned on when the image selection processing is started. When an image corresponding to the whole body image of the target person is obtained, for example, the processing flag is switched to OFF, and the image selection processing is completed.

In image selection processing (step S107), the management server 10 (image selection unit 14) selects an image in which a part other than the face of the target person is captured among a plurality of capturing images based on the positional relationship between the face image of the target person and the face images of peripheral persons in the capturing image acquired from the image capturing apparatus 30. Details of the image selection processing will be described later.

Next, the management server 10 (display control unit 16) displays a monitoring screen on the display device 156 based on the capturing image selected in the image selection process (step S108).

Figure 8:
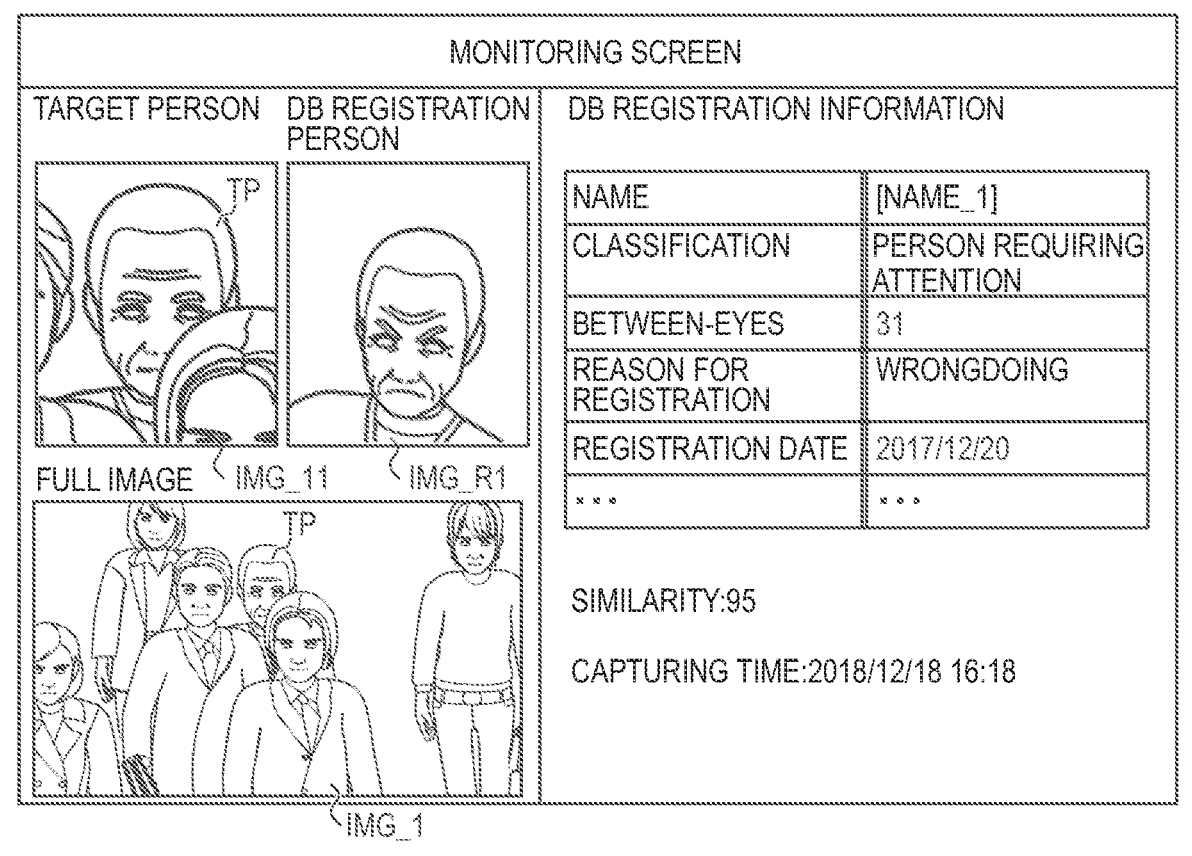

FIG. 8 is a diagram illustrating an example of a monitoring screen displayed on the management server 10 in the present example embodiment. Here, a face image IMG_11 of the target person TP, a face image IMG_R1 of the person registered in the database, and a capturing image IMG_1 as an extraction source of the face image IMG_11 are displayed in a left column of the monitoring screen. In a column on the right side of the monitoring screen, registration information of the registered person (name/classification/between-eyes/ reason for registration/registration date, etc.), similarity (matching score) between the registered person and the target person TP, and capturing time information of the capturing image IMG_1 are displayed.

The management server 10 (notification unit 15) transmits the display control information to the user terminal 20 (step S109). The user terminal 20 (display unit 22) displays a notification screen on the display device 256 based on the display control information received from the management server 10 (step S110).

Figure 9:
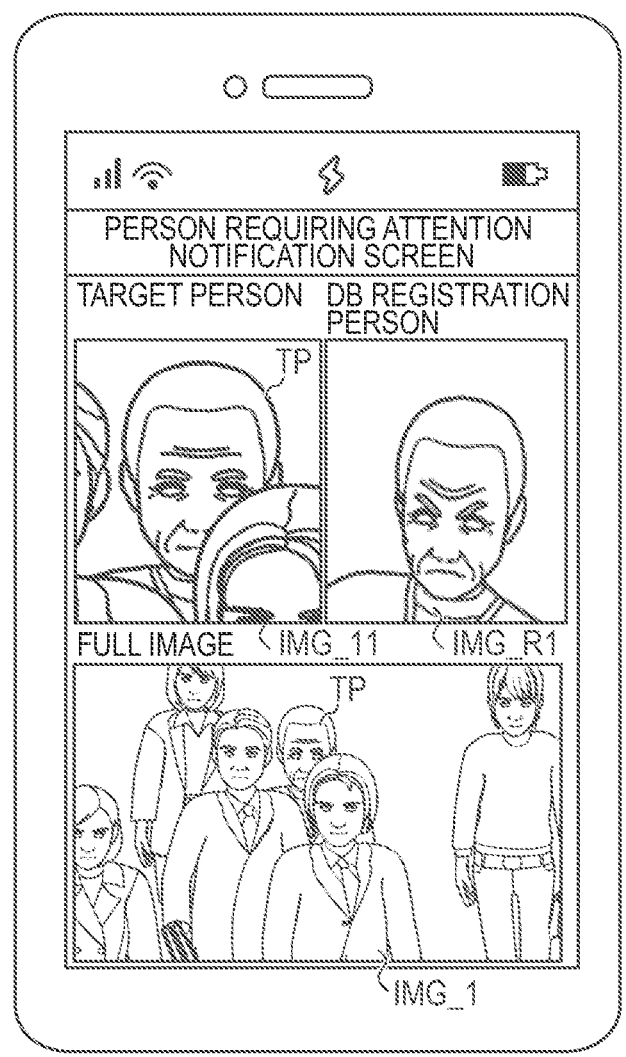
FIG. 9 is a diagram illustrating an example of a notification screen displayed on the user terminal in the first example embodiment.

FIG. 9 is a diagram illustrating an example of a notification screen displayed on the user terminal 20 in the present example embodiment. Here, as in the monitoring screen shown in FIG. 8, the face image IMG_11 of the target person TP, the face image IMG_R1 of the person registered in the database, and the capturing image IMG_1 as the source of extraction of the face image IMG_11 are displayed. The security guard G can search for the target person TP in the facility by referring to the notification screen. The image of the target person TP displayed on the screen is updated to a more appropriate image, but the details will be described later.

Next, the management server 10 (image selection unit 14) determines whether or not the processing flag is ON (step S111). If the management server 10 (image selection unit 14) determines that the processing flag is ON (step 111: YES), the process proceeds to step S112. On the other hand, when the management server 10 (image selection unit 14) determines that the processing flag is OFF (step S111: NO), the processing of FIG. 7 ends.

In step S112, the management server 10 (image selection unit 14) determines whether or not the target person is outside the monitoring area. If the management server 10 (image selection unit 14) determines that the target person is outside the monitoring area (step S112: YES), the process of FIG. 7 ends. On the other hand, if the management server 10 (image selection unit 14) determines that the target person is within the monitoring area (step S112: NO), the process returns to step S107. That is, the processes in steps S107 to S112 are repeated while the target person exists in the monitoring area and is displayed in the capturing image.

Figure 10:
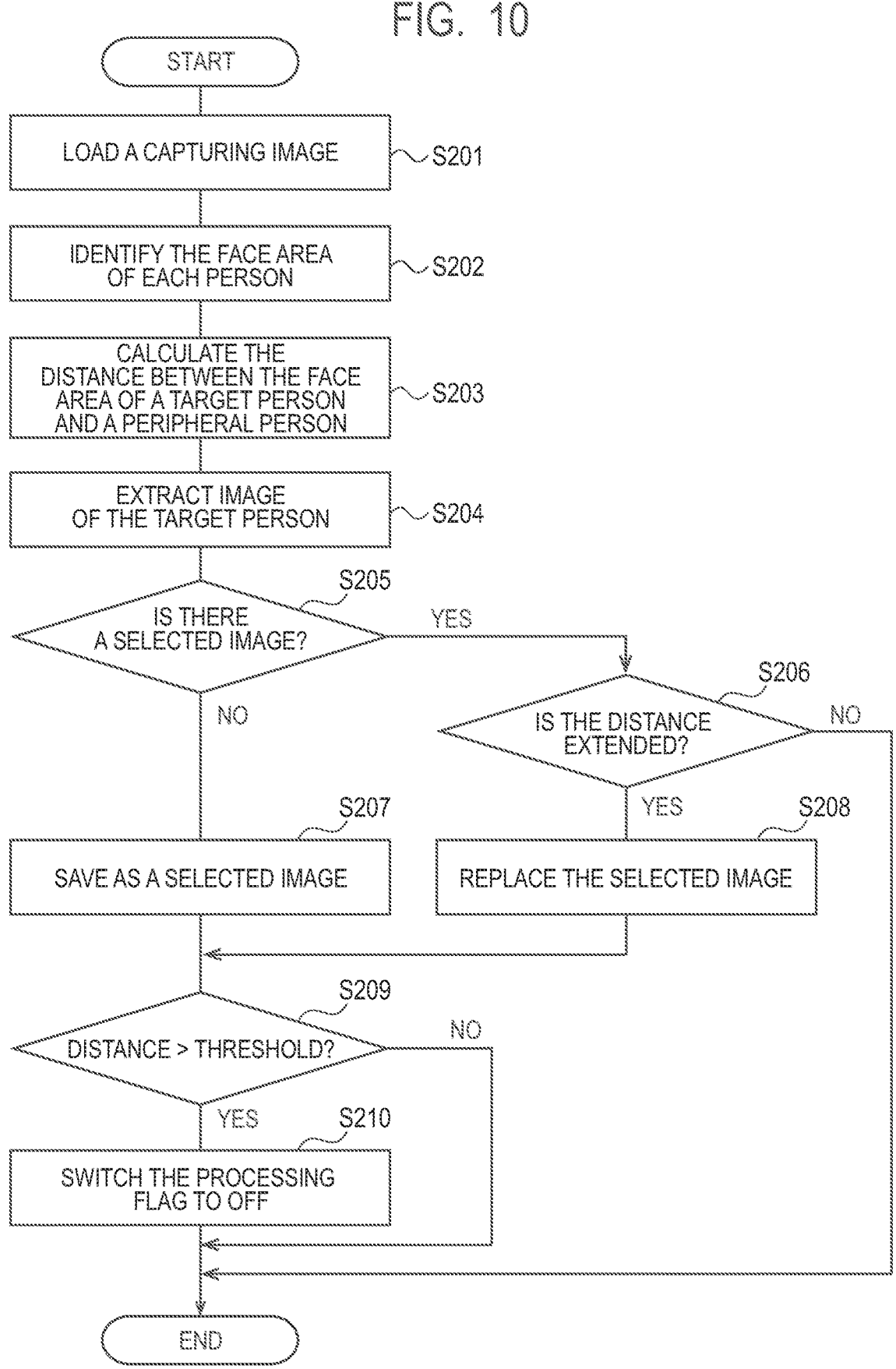
FIG. 10 is a flowchart illustrating an example of an image selection processing in the first example embodiment.

FIG. 10 is a flowchart illustrating an example of image selection processing in the present example embodiment. Note that, this processing corresponds to step S107 in FIG. 7.

First, when the image selection unit 14 loads the capturing image from the storage unit 11 (step S201), the image selection unit analyzes the capturing image and specifies the face region of each person (step S202). That is, the image selection unit 14 detects a face area for each of the target person and the peripheral person by face image identification processing.

Next, the image selection unit 14 calculates the distance between the face areas of the target person and the peripheral person (step S203), and extracts the face image of the target person from the capturing image (step S204). It is preferable that the face image of the target person is obtained from a trimming area set wider than the face detection area of the target person from the whole capturing image. The distance between the target person and the peripheral person in the present example embodiment means in-image distance between the coordinates of the center point (first coordinate point) of the face detection area (face area) of the target person and the coordinates of the center point (second coordinate point) of the face detection area of the peripheral person.

Next, the image selection unit 14 determines whether or not there is a selected capturing image for confirming the person of the target person (step S205). If the image selection unit 14 determines that there is a selected capturing image in the storage unit 11 (step S205: YES), the process proceeds to step S206.

On the other hand, if the image selection unit determines that there is not a selected capturing image in the storage unit 11 in the storage unit 11 (step S205: NO), the image selection unit 14 stores the capturing image loaded in step S201 in the storage unit 11 as a selected image (step S207). Thereafter, the process proceeds to step S209.

In step S206, the image selection unit 14 compares the distance between the target person and the peripheral person in the saved selected image with the distance between the target person and the peripheral person in the capturing image loaded in step S201, and determines whether or not the distance is extended compared to the last time.

When the image selection unit 14 determines that the distance is extended compared to the last time (step 206: YES), the image selection unit 14 overwrites and stores the capturing image in the storage unit 11 so as to replace the selected image to be displayed on the user terminal 20 or the display device 156 (step S208). Thereafter, the process proceeds to step S209. On the other hand, if the image selection unit 14 determines that the distance is not extended compared to the last time (step S206: NO), the process ends.

In step S209, the image selection unit 14 determines whether the distance between the target person and the peripheral person in the capturing image exceeds a predetermined threshold value. Here, if it is determined that the distance between the target person and the peripheral person exceeds the predetermined threshold value (step S209: YES), the image selection unit 14 switches the processing flag to OFF (step S210) and ends the processing. That is, when only the target person is captured in the capturing image, or when the target person and the peripheral person are in a positional relationship sufficiently distant from each other, it is considered that an image corresponding to the whole body image of the target person has been acquired, and image selection processing for the same target person is not performed.

On the other hand, if the image selection unit 14 determines that the distance between the target person and the peripheral person does not exceed the predetermined threshold value (step S209: NO), the processing flag is kept ON, and the processing of FIG. 10 ends.

Figure 11:
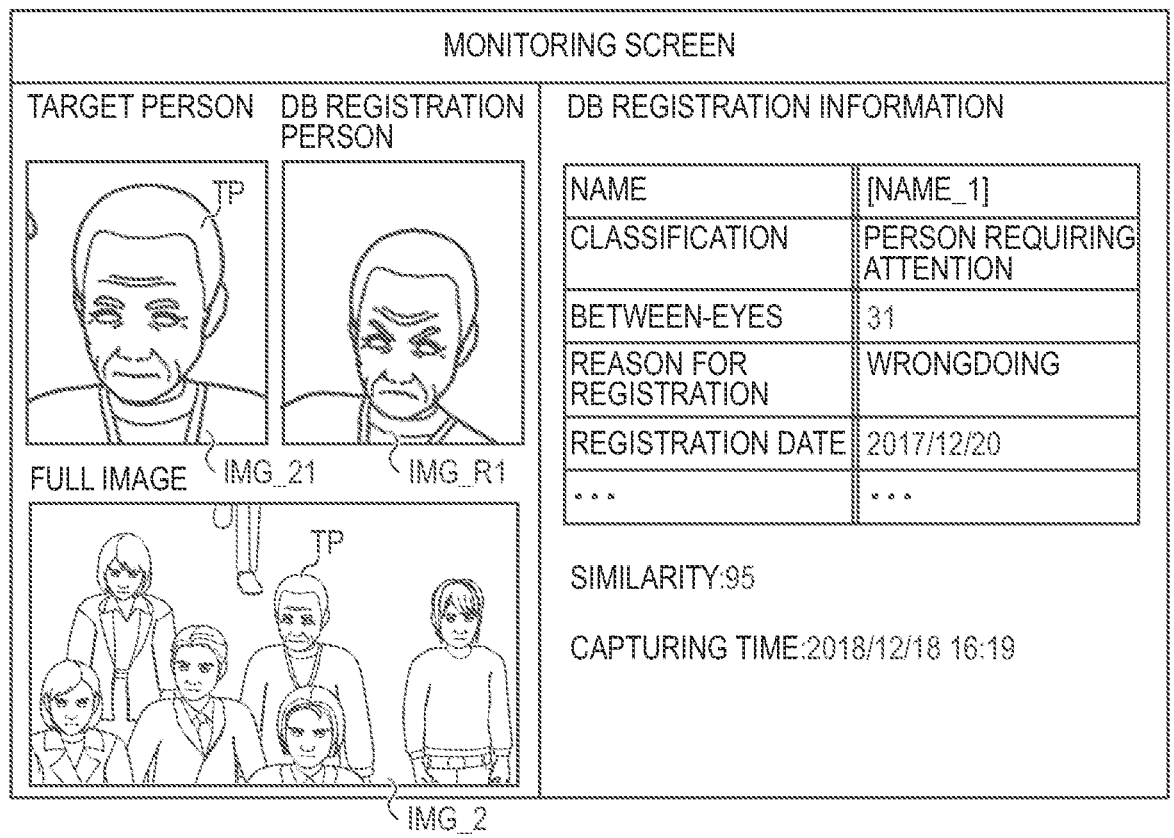
FIG. 11 is a diagram illustrating an example of a monitoring screen displayed on the management server in the first example embodiment.

FIG. 11 is a diagram illustrating an example of a monitoring screen displayed on the management server 10 in the present example embodiment. Here, as compared with the monitoring screen shown in FIG. 8, it is shown that the face image of the target person TP is replaced from the face image IMG_11 to the face image IMG_21, and the whole image is replaced from the capturing image IMG_1 to the capturing image IMG_2.

Figure 12:
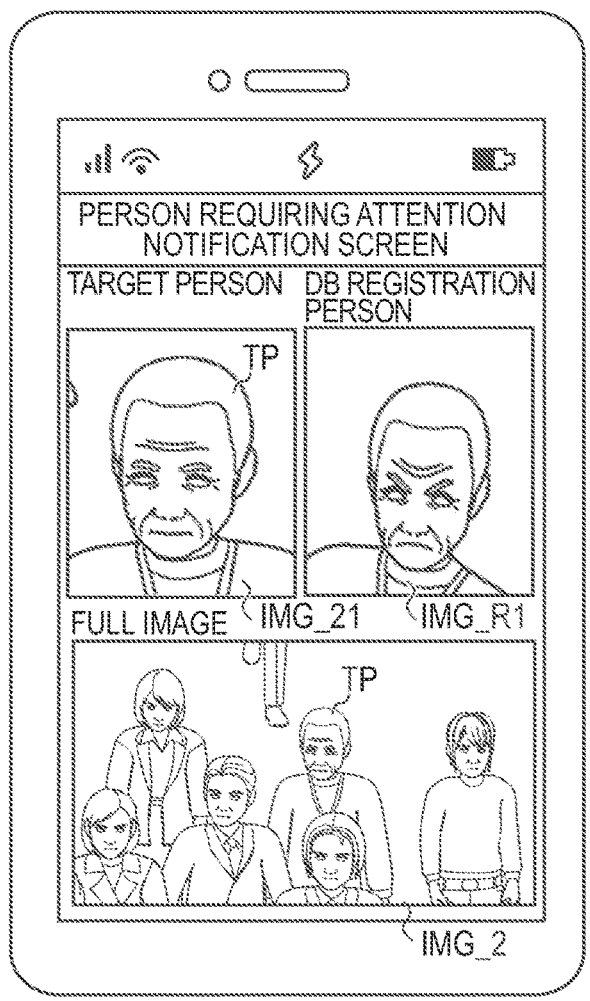
FIG. 12 is a diagram illustrating an example of a notification screen displayed on the user terminal in the first example embodiment.

FIG. 12 is a diagram illustrating an example of a notification screen displayed on the user terminal 20 in the present example embodiment. In this case, similarly to the monitoring screen shown in FIG. 11, the display image of the target person TP is replaced with the face image IMG_21 of the target person TP and the capturing image IMG_2. The capturing image IMG_2 after the replacement is an image that is easier to confirm the clothes of the target person TP than the capturing image IMG_1 before the replacement. As described above, the replacement of the person confirmation image relating to the target person TP is repeatedly executed during a period in which the target person TP is captured in the monitoring area until a predetermined condition is satisfied. That is, when the optimum capturing image is obtained, the display image is automatically updated so that the search of the target person TP by the security guard G is supported.

As described above, according to the monitoring system 1 in the present example embodiment, based on the position of a person (peripheral person) other than the target person in the capturing image, the capturing image in which a region other than the face of the target person is captured can be selected and displayed on the user terminal 20. Further, since the capturing image to be displayed on the screen can be selected based on the simple processing flow, there is an advantage that the apparatus can be mounted at a low cost without providing a special image processing engine.

Second Example Embodiment

A monitoring system 1 in a second example embodiment will be described below. Note that the same reference numerals as the reference numerals assigned in the drawings by the first example embodiment denote the same objects. The description of the parts common to the first example embodiment is omitted, and the different parts are described in detail.

In the first example embodiment described above, the image selection unit 14 selects, among the plurality of images, an image having the longest in-image distance between the center coordinate point (first coordinate point) of the face image of the target person and the center coordinate point (second coordinate point) of the face image of the peripheral person. On the other hand, the image selection unit 14 of the present example embodiment differs from the first example embodiment in that the image is selected based on the positional relationship between the target person and the peripheral person within the overlap determination area set based on the display area of the face image of the target person.

Figure 13:
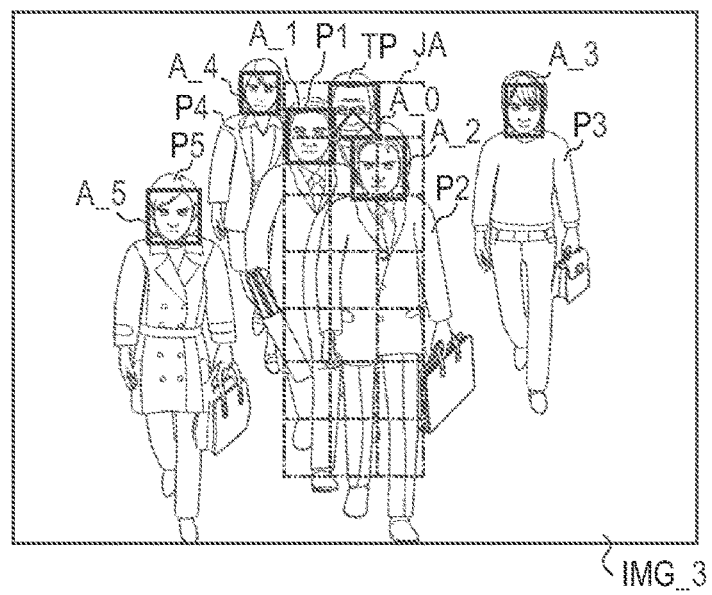
FIG. 13 is a diagram explaining an image selection method in a second example embodiment.
Figure 14:
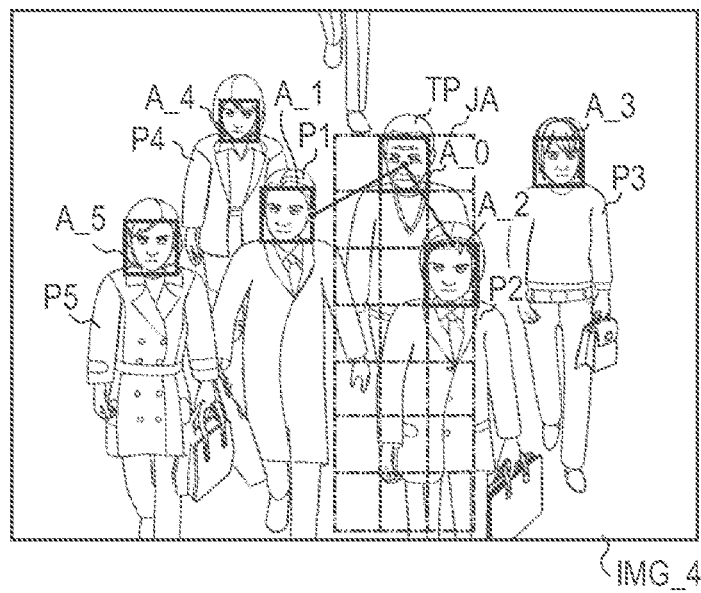
FIG. 14 is a diagram explaining the image selection method in the second example embodiment.
Figure 15:
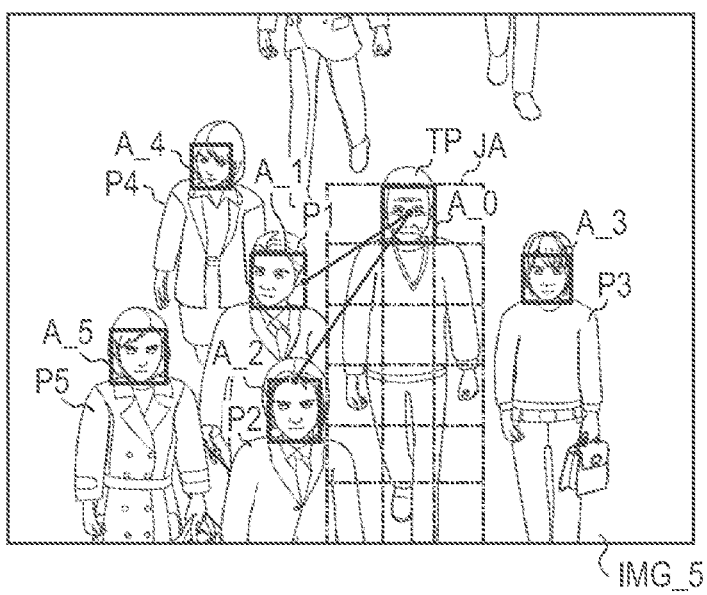
FIG. 15 is a diagram explaining the image selection method in the second example embodiment.

FIGS. 13 to 15 are diagrams explaining an image selection method in the present example embodiment. In FIG. 13, it is shown that an overlap determination area JA indicated by a chain line is set around the face detection area A_0 of the target person TP. Here, the length of the overlap determination area JA in the horizontal direction (Left and right directions in the figure) is set to about 3 to 4 times the length of the face detection area A_0 in the horizontal direction. The length of the overlap determination area JA in the vertical direction (Up and down directions in the figure) is set from 7 to 8 times the length of the face detection area A_0 in the vertical direction. The size of the overlap determination area JA is set based on the size of the face detection area of the target person to a size assumed to include the torso of the target person. In consideration of the fact that the standard adult size is from 7 to 8 heads tall, the vertical length of the overlap determination area JA may be set from 7 to 8 times the vertical length of the head of the target person TP. Similarly, the length of the overlap determination area JA in the horizontal direction may be set from 3 to 4 times the length of the head of the target person TP in the horizontal direction.

In FIG. 13, the overlap determination area JA includes a face detection area A_1 of the peripheral person P1 and a face detection area A_2 of the peripheral person P2. It is shown that the inter-coordinate distance between the center coordinate point of the face detection area A_0 of the target person TP and the coordinate point located at the center of the right side of the face detection area A_1 of the peripheral person P1 is calculated. Similarly, the inter-coordinate distance between the center coordinate point of the face detection area A_0 of the target person TP and the coordinate point located at the center of the upper side of the face detection area A_2 of the peripheral person P2 is calculated.

In FIG. 14, the peripheral person P1 is outside the range of the overlap determination area JA. Therefore, the peripheral person P1 is considered to be sufficiently distant from the target person TP, and it is not necessary to recalculate the distance. On the other hand, the peripheral person P2 exists in the overlap determination area JA but is farther away from the target person TP than in the state shown in FIG. 13. Therefore, the image displayed on the user terminal 20 is replaced from the capturing image IMG_3 to the capturing image IMG_4.

In FIG. 15, the peripheral person P2 is outside the range of the overlap determination area JA. Therefore, the peripheral person P2 is considered to be sufficiently distant from the target person TP. The overlap determination area JA does not include a face detection area of a person other than the target person TP. Therefore, the image displayed on the user terminal 20 is replaced again from the capturing image IMG_4 to the capturing image IMG_5. Note that the image selection process is ended when the capturing image IMG_5 containing no person other than the target person TP is obtained.

Figure 16:
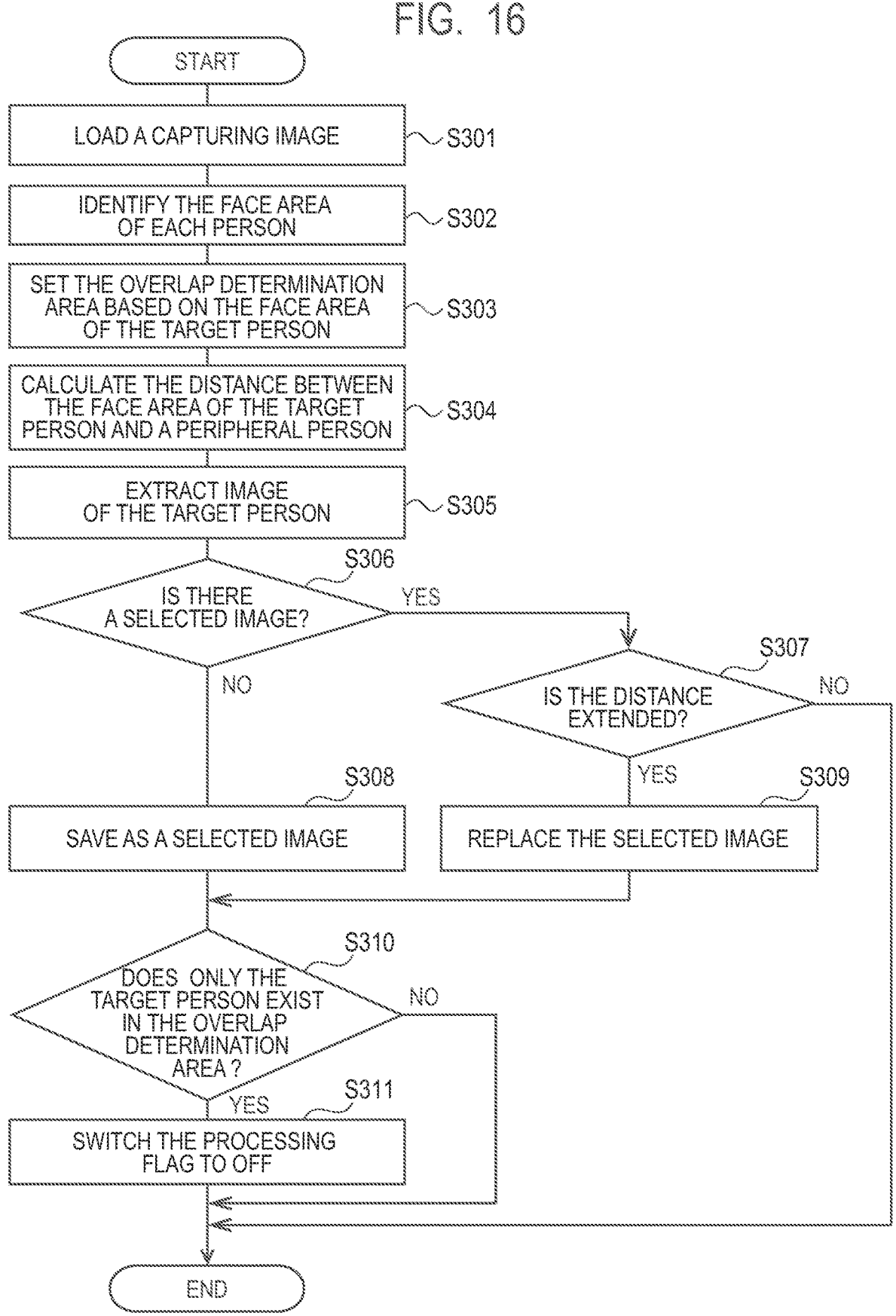
FIG. 16 is a flowchart illustrating an example of an image selection processing in the second example embodiment.

Next, the processing in the monitoring system 1 configured as described above will be described. FIG. 16 is a flowchart illustrating an example of image selection processing in the present example embodiment. This processing corresponds to step S107 in FIG. 7.

First, when the image selection unit 14 loads the capturing image from the storage unit 11 (step S301), the image selection unit analyzes the capturing image and specifies the face region of each person (step S302). That is, the image selection unit 14 detects a face area for each of the target person and the peripheral person by face image identification processing.

Next, the image selection unit 14 sets an overlap determination area based on the face area of the target person (step S303). The size of the overlap determination area can be arbitrarily changed.

Next, the image selection unit 14 calculates the distance between the face areas of the target person and the peripheral person existing in the overlap determination area (step S304), and extracts the face image of the target person among the capturing image (step S305). It is preferable that the face image of the target person is obtained from a trimming area set wider than the face detection area of the target person from the whole capturing image.

Next, the image selection unit 14 determines whether or not there is a selected capturing image for confirming the person of the target person (step S306). If the image selection unit 14 determines that there is a selected capturing image in the storage unit 11 (step S306: YES), the process proceeds to step S307. On the other hand, if the image selection unit determines that there is not a selected capturing image in the storage unit 11 (step S306: NO), the image selection unit 14 stores the capturing image loaded in step S301 in the storage unit 11 as a selected image (step S308). Thereafter, the process proceeds to step S310.

In step S307, the image selection unit 14 compares the distance between the target person and the peripheral person in the saved selected image with the distance between the target person and the peripheral person in the capturing image read in step S301, and determines whether or not the distance is extended compared to the last time. Note that the distance between the target person and the peripheral person in the present example embodiment means the distance between the coordinates of the center point (first coordinate point) of the face detection area (face area) of the target person and the center point (second coordinate point) of the four sides of the face detection area of the peripheral person. It is to be noted that the center point used as the second coordinate point is a point closest to the first coordinate point among the four points.

When the image selection unit determines that the distance is extended compared to the last time (step S307: YES), the image selection unit 14 overwrites and stores the capturing image in the storage unit 11 so as to replace the selected image to be displayed on the user terminal 20 or the display device 156 (step S309). Thereafter, the process proceeds to step S310. On the other hand, if the image selection unit 14 determines that the distance is not extended compared to the last time (step S307: NO), the process ends.

That is, the image selection unit 14 selects, from among the plurality of capturing images, the capturing image having the longest in-image distance between the center coordinate point of the face image of the target person in the overlap determination area and the coordinate point of the face detection area set in a rectangular shape for the person other than the target person.

In step S310, the image selection unit 14 determines whether or not only the target person exists in the overlap determination area. Here, if it is determined that only the target person exists in the overlap determination area (step S310: YES), the image selection unit 14 switches the processing flag to OFF (step S311) and ends the processing. That is, the image selection unit 14 finally selects a capturing image in which persons other than the target person are not included in the overlap determination area. Thus, when only the target person is captured in the capturing image or when the target person and the peripheral person are in a positional relationship sufficiently distant from each other, it is considered that an image corresponding to the whole body image of the target person has been acquired, and image selection processing for the same target person is not performed.

On the other hand, if the image selection unit 14 determines that a person other than the target person exists in the overlap determination area (step S310: NO), the processing flag is kept ON, and the processing of FIG. 16 ends.

As described above, according to the monitoring system 1 in the present example embodiment, since the positional relationship between the target person and the peripheral persons is determined based on the overlap determination area set based on the position of the face detection area (face image) of the target person, the number of the peripheral persons for which the positional relationship with the target person should be considered can be reduced, so that the determination can be made more easily than in the case of the first example embodiment.

Third Example Embodiment

A monitoring system 1 in a third example embodiment will be described below. Note that the same reference numerals as the reference numerals assigned in the drawings by the first and second example embodiment denote the same objects. The description of the parts common to the first and second example embodiment is omitted, and the different parts are described in detail.

The image selection unit of the present example embodiment is different from the second example embodiment in that the image selection unit 14 further has a function of limiting a peripheral person to be the object of determining the overlap degree with the target person to a person positioned in front of the target person. That is, the positional relationship between the peripheral person positioned behind the target person and the target person is not considered even if the peripheral person is included in the overlap determination area.

Figure 17:
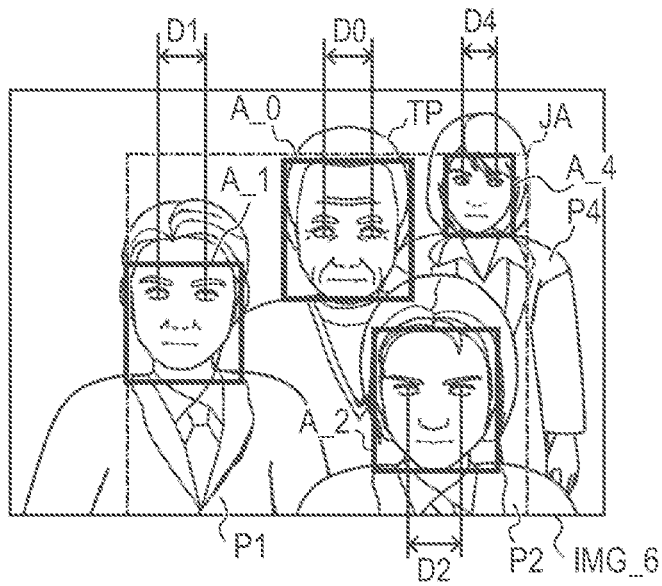
FIG. 17 is a diagram explaining a back and forth determination method in the third example embodiment.

FIG. 17 is a diagram for explaining a back-and-forth determination method in the present example embodiment. Here, an target person TP and three peripheral persons P1, P2, P4 exist in the capturing image IMG_6. The interocular distance of the target person TP is D0. The interocular distance of the peripheral persons P1, P2, and P4 is shown to be D1, D2, and D4, respectively.

Here, there is a relationship D4<D0<D1<D2 between the interocular distances D0, D1, D2, and D4 of each person. In the present example embodiment, it is determined that the peripheral person P4 is located behind the target person TP because the interocular distance is shorter than that of the target person TP (D4<D0). On the other hand, it is determined that the peripheral persons P1 and P2 are located in front of the target person TP because the interocular distance is longer than that of the target person TP (D0<D1<D2). As a result, even a person included in the overlap determination area JA is excluded from the determination object of the positional relationship for the peripheral person P4 positioned behind the target person.

Figure 18:
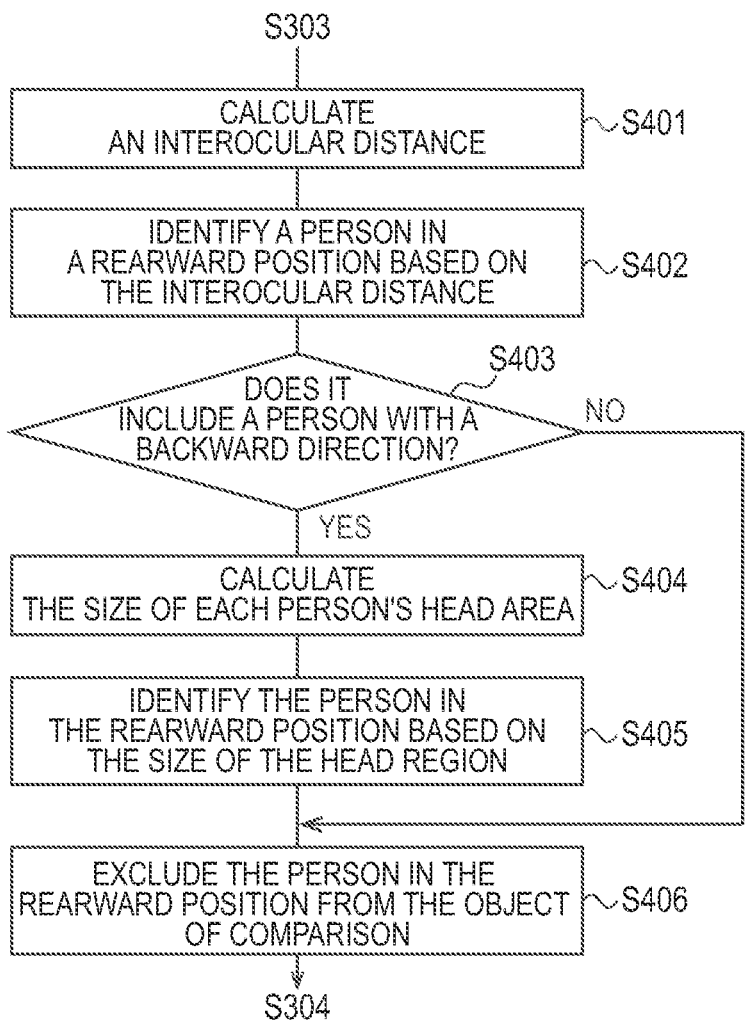
FIG. 18 is a flowchart illustrating an example of a back and forth determination process in the third example embodiment.

FIG. 18 is a flowchart illustrating an example of a back-and-forth determination processing in the present example embodiment. This process is executed, for example, between steps S303 and S304 shown in FIG. 16.

First, when the image selection unit calculates the interocular distance of each person included in the capturing image (step S401), the image selection unit 14 specifies the person existing at the rearward position of the target person based on the interocular distance (step S402). Since the interocular distance of the rear-facing person cannot be calculated, the rear-facing person is not identified even if the person exists in the rearward position.

Next, the image selection unit 14 determines whether or not the capturing image includes a person with a backward direction (step S403). For example, if the eyeball cannot be detected, but the head can be detected from other parts such as the ear or the neck, this is the backward-facing condition. If the image selection unit 14 determines that the capturing image includes the person with a backward direction (step S403: YES), the process proceeds to step S404. On the other hand, if the image selection unit 14 determines that the capturing image does not include the person with a backward direction (step S403: NO), the process proceeds to step S406.

In step S404, the image selection unit 14 calculates the size of the head region of each person. In order to compare the size of the head with that of the target person, the same calculation shall be made for the target person.

Next, the image selection unit 14 specifies a peripheral person existing at the rearward position of the target person based on the size of the head region (step S405).

In step 406, when the image selection unit 14 excludes the person in the rearward position from the object of comparison with the target person, the process proceeds to step S304. For a peripheral person who is backward-facing and located in front of the target person, the degree of overlap with the target person can be similarly determined by changing the setting of the face detection area (face image) used for extracting the positional relationship to the head detection area (head image).

As described above, according to the monitoring system 1 in the present example embodiment, the number of persons to be subjected to the determination of the positional relationship can be reduced to the number of persons positioned in front of the target person, so that there is an advantage that the processing can be performed more easily than in the case of the example embodiment described above.

Fourth Example Embodiment

Figure 19:
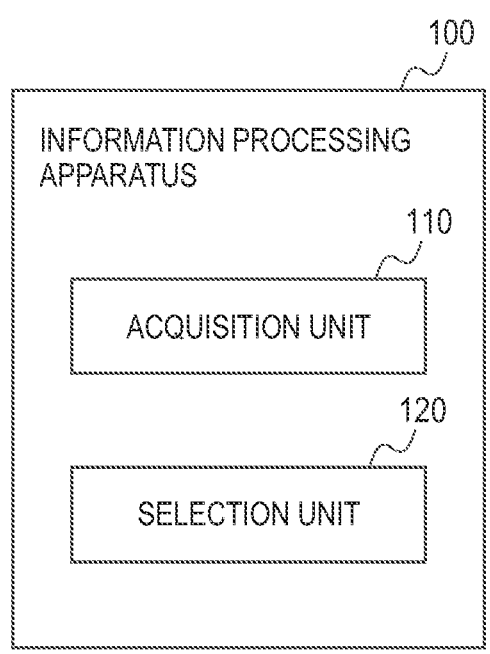
FIG. 19 is a block diagram illustrating the functions of an information processing apparatus in a fourth example embodiment.

FIG. 19 is a block diagram illustrating a function of the information processing apparatus 100 in the present example embodiment. The information processing apparatus 100 in the present example embodiment includes an acquisition unit 110 and a selection unit 120. The acquisition unit 110 acquires an image including a face image of a person. The selection unit 120 selects the image in which the part other than the face of a target person is captured among the plurality of images by using the position of the face image of a person other than the target person in the acquired image. According to the present example embodiment, it is possible to select an image in which the face of a target person and the clothes thereof can be easily confirmed.

Modified Example Embodiments

While the present invention has been described above with reference to the example embodiments, the present invention is not limited the example embodiments described above. Various modifications that can be understood by those skilled in the art can be made to the configuration and details of the present invention without departing from the spirit of the present invention. For example, it should be appreciated that an example embodiment in which a part of the configuration of any of the example embodiments is added to another example embodiment or an example embodiment in which any of the example embodiments is replaced with a part of the configuration of another example embodiment is also one of the example embodiments to which the present invention may be applied.

In the example embodiment described above, although the degree of overlap between the target person and the peripheral person is determined based on the distance between the coordinates, the area of the face image area may be used. For example, the image selection unit 14 may select an image having the lowest area ratio of a face image of a person other than the target person in the overlap determination area.

Further, in the example embodiment described above, although the process is performed on the target person who is matched with the registered person in the database, the matching process may be omitted. For example, when a user such as an administrator manually designates a person on the monitoring screen, the image selection process may be executed with the designated person as the target person. In this case, when the administrator or the security guard G newly finds a suspicious person, there is an advantage that the suspicious person can be designated and tracked.

Further, in the example embodiment described above, although the capturing image before replacement is not displayed, the image before replacement may be switched and displayed. Further, a plurality of capturing images satisfying predetermined display conditions may be displayed side by side. In this case, there is an advantage that the user can select an image in which the user can easily confirm the target person.

Further, the scope of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

Supplementary Note 1

An information processing apparatus comprising: an acquisition unit for acquiring an image including a face image of a person; and a selection unit for selecting the image in which the part other than the face of a target person is captured among the plurality of images by using the position of the face image of a person other than the target person in the acquired image.

Supplementary Note 2

The information processing apparatus according to supplementary note 1, wherein the selection unit selects an image in which a portion other than the face of the target person is captured from the plurality of images based on the positional relationship between the face image of the target person and the face image of the person other than the target person in the acquired image.

Supplementary Note 3

The information processing apparatus according to supplementary note 2, wherein the selecting unit selects the image having the longest in-image distance between the first coordinate point of the face image of the target person and the second coordinate point of the face image of the person other than the target person among the plurality of images.

Supplementary Note 4

The information processing apparatus according to supplementary note 3, wherein the selection unit selects the image having the longest in-image distance between the center coordinate point of the face image of the target person and the face detection area set in a rectangular shape for the person other than the target person among the plurality of images.

Supplementary Note 5

The information processing apparatus according to any one of supplementary notes 2 to 4, wherein the selection unit selects the image based on the positional relationship within a range of an overlap determination area set with the display area of the face image of the target person as a reference.

Supplementary Note 6

The information processing apparatus according to supplementary note 5, wherein the selection unit selects the image in which the person other than the target person is not included in the overlap determination area.

Supplementary Note 7

The information processing apparatus according to supplementary note 5, wherein the selection unit selects the image having the lowest area ratio of the face image of the person other than the target person in the overlap determination area.

Supplementary Note 8

The information processing apparatus according to any one of supplementary notes 5 to 7, the overlap determination area is set based on the position and size of a display area of the face image of the target person in the image.

Supplementary Note 9

The information processing apparatus according to any one of supplementary notes 2 to 8, wherein the selecting unit selects the image based on the positional relationship between the target person and the person existing in front of the target person.

Supplementary Note 10

The information processing apparatus according to supplementary note 9, wherein the selection unit compares a first size of a display area of a face image of the target person with a second size of a display area of a face image of the person in the image, and determines that the person is in front of the target person when the second size is larger than the first size.

Supplementary Note 11

The information processing apparatus according to supplementary note 9, wherein the selection unit compares the first interocular distance of the target person with the second interocular distance of the person in the image, and determines that the person is in front of the target person when the second interocular distance is longer than the first interocular distance.

Supplementary Note 12

The information processing apparatus according to any one of supplementary notes 1 to 11, wherein the selection unit repeatedly executes a selection processing of the image during a period in which the image in which the target person is captured is acquired.

Supplementary Note 13

The information processing apparatus according to any one of supplementary notes 1 to 12 further comprising a matching unit for matching the face image of the person with the face image of the person previously registered in the database; and wherein the selecting unit, when the matching results of the person with the target person match, repeatedly executes a selection process of the image during a period in which the image in which the target person is captured is acquired.

Supplementary Note 14

An information processing method comprising:
acquiring an image including a face image of a person; and
selecting the image in which the part other than the face of a target person is captured among the plurality of images by using the position of the face image of a person other than the target person in the acquired image.

Supplementary Note 15

A storage medium storing a program that causes a computer to perform:
acquiring an image including a face image of a person; and
selecting the image in which the part other than the face of a target person is captured among the plurality of images by using the position of the face image of a person other than the target person in the acquired image.

This application is based upon and claims the benefit of priority from Japanese Patent Application No. 2019-010011, filed on Jan. 24, 2019, the disclosure of which is incorporated herein in its entirety by reference.

REFERENCE SIGNS LIST

NW network
G security guard (user)
1 monitoring system
10 management server
11 storage unit
12 image acquisition unit
13 matching unit
14 image selection unit
15 notification unit
16 display control unit
20 user terminal
21 communication unit
22 display unit
23 input unit
30 image capturing apparatus
40 access point
100 information processing apparatus
110 acquisition unit
120 selection unit
151,251 CPU
152,252 RAM
153,253 ROM
154 HDD
155,255 communication I/F
156,256 display device
157,257 input device
158,258 bus
254 flash memory
259 camera

The invention claimed is:

1. An information processing apparatus comprising:
at least one memory storing instructions; and
at least one processor configured to execute the instructions to:
acquire a plurality of images including a face of a target person;
detect a face of another person from each of the plurality of images;
select, from the plurality of images, one best image in which the face of the another person and the face of the target person is most separated each other based on a distance from the face of the another person to the face of the target person in each of the plurality of images and displaying the one best image thus selected; and
when a better image in which the face of the another person and the face of the target person is more separated than the one best image is acquired, replace displayed image with the better image.

2. The information processing apparatus according to claim 1, wherein the processor is configured to select an image in which a portion other than the face of the target person is captured from the plurality of images based on positional relationship between the face of the target person and the face of the another person in each of the plurality of images.

3. The information processing apparatus according to claim 2, wherein the processor is configured to select the one best image based on the positional relationship between the face of the target person and the face of the another person within a range of an overlap determination area set with region of the face of the target person as a reference.

4. The information processing apparatus according to claim 2, wherein the processor is configured to select the one best image based on the positional relationship between the target person and another person existing in front of the target person.

5. An information processing method performed by a computer and comprising:
acquiring a plurality of images including a face of a target person;
detecting a face of another person from each of the plurality of images;
selecting, from the plurality of images, one best image in which the face of the another person and the face of the target person is most separated each other based on a distance from the face of the another person to the face of the target person in each of the plurality of images and displaying the one best image thus selected; and
when a better image in which the face of the another person and the face of the target person is more separated than the one best image is acquired, replacing displayed image with the better image.

6. The information processing method according to claim 5, wherein the information processing method comprises:
selecting an image in which a portion other than the face of the target person is captured from the plurality of images based on positional relationship between the face of the target person and the face of the another person in each of the plurality of images.

7. The information processing method according to claim 6, wherein the information processing method comprises:
selecting the image based on the positional relationship between the face of the target person and the face of the another person within a range of an overlap determination area set with region of the face of the target person as a reference.

8. The information processing method according to claim 6, wherein the information processing method comprises:
selecting the image based on the positional relationship between the target person and another person existing in front of the target person.

9. A non-transitory storage medium storing a program executable by a computer to perform processing comprising:
acquiring a plurality of images including a face of a target person;
detecting a face of another person from each of the plurality of images;
selecting, from the plurality of images, one best image in which the face of the another person and the face of the target person is most separated each other based on a distance from the face of the another person to the face of the target person in each of the plurality of images and displaying the one best image thus selected; and
when a better image in which the face of the another person and the face of the target person is more separated than the one best image is acquired, replacing displayed image with the better image.

10. The non-transitory storage medium according to claim 9, wherein the processing comprises:
selecting an image in which a portion other than the face of the target person is captured from the plurality of images based on positional relationship between the face of the target person and the face of the another person in each of the plurality of images.

11. The non-transitory storage medium according to claim 10, wherein the processing comprises:
selecting the image based on the positional relationship between the face of the target person and the face of the another person within a range of an overlap determination area set with region of the face of the target person as a reference.

12. The non-transitory storage medium according to claim 10, wherein the processing comprises:
selecting the image based on the positional relationship between the target person and another person existing in front of the target person.

* * * * *